US010328880B2

(12) United States Patent
Huang

(10) Patent No.: US 10,328,880 B2
(45) Date of Patent: Jun. 25, 2019

(54) PNEUMATIC MOTOR VEHICLE WINDOW BREAKING DEVICE

(71) Applicant: Bin Huang, Zhejiang (CN)

(72) Inventor: Bin Huang, Zhejiang (CN)

( * ) Notice: Subject to any disclaimer, the term of this patent is extended or adjusted under 35 U.S.C. 154(b) by 157 days.

(21) Appl. No.: 15/538,206

(22) PCT Filed: Dec. 23, 2015

(86) PCT No.: PCT/CN2015/098369
§ 371 (c)(1),
(2) Date: Jun. 21, 2017

(87) PCT Pub. No.: WO2016/119541
PCT Pub. Date: Aug. 4, 2016

(65) Prior Publication Data

US 2017/0341613 A1 Nov. 30, 2017

(30) Foreign Application Priority Data

Jan. 30, 2015 (CN) .......................... 2015 1 0050915

(51) Int. Cl.
*B60R 21/02* (2006.01)
*A62B 3/00* (2006.01)
*B60R 21/00* (2006.01)

(52) U.S. Cl.
CPC .............. *B60R 21/02* (2013.01); *A62B 3/005* (2013.01); *B60R 21/00* (2013.01); *B60R 2021/0016* (2013.01); *B60R 2021/0027* (2013.01)

(58) Field of Classification Search
CPC ................ B60R 2021/0027; B60R 2021/0016
See application file for complete search history.

(56) References Cited

U.S. PATENT DOCUMENTS

| | | | | |
|---|---|---|---|---|
| 6,418,628 B1 * | 7/2002 | Steingass | A62B 3/005 | 30/366 |
| 7,028,874 B2 * | 4/2006 | Lin | A62B 3/005 | 173/202 |
| 7,988,078 B1 * | 8/2011 | Roy | A62B 3/005 | 241/33 |
| 8,727,060 B1 * | 5/2014 | Erickson | B60R 21/00 | 180/271 |
| 8,869,927 B2 * | 10/2014 | Oosterhuis | B60R 21/0136 | 180/271 |
| 9,409,043 B2 * | 8/2016 | Franken | A62B 3/005 | |
| 2003/0136009 A1 * | 7/2003 | McNeill | F42B 3/006 | 30/361 |
| 2004/0050607 A1 * | 3/2004 | Souther | A62B 3/005 | 180/271 |

* cited by examiner

*Primary Examiner* — Nicole T Verley
(74) *Attorney, Agent, or Firm* — Leong C. Lei

(57) ABSTRACT

A pneumatic motor vehicle window breaking device used in vehicles, comprising: a cylinder and a spike, wherein one end of the spike is fixedly connected to an end of a piston rod of the cylinder, and the other end of the spike is tapered; the cylinder is mounted on a retaining frame. The pneumatic motor vehicle window breaking device directly uses the cylinder and takes high-pressure air as power; only a front end of the spike of the pneumatic motor vehicle window breaking device is required to be mounted at an appropriate position in alignment with a vehicle window before use, and an air valve controls high-pressure air source to drive the spike to complete window breaking, and the device employs a simple structure.

5 Claims, 10 Drawing Sheets

11
1
5
4
4
2
301
3
6
302

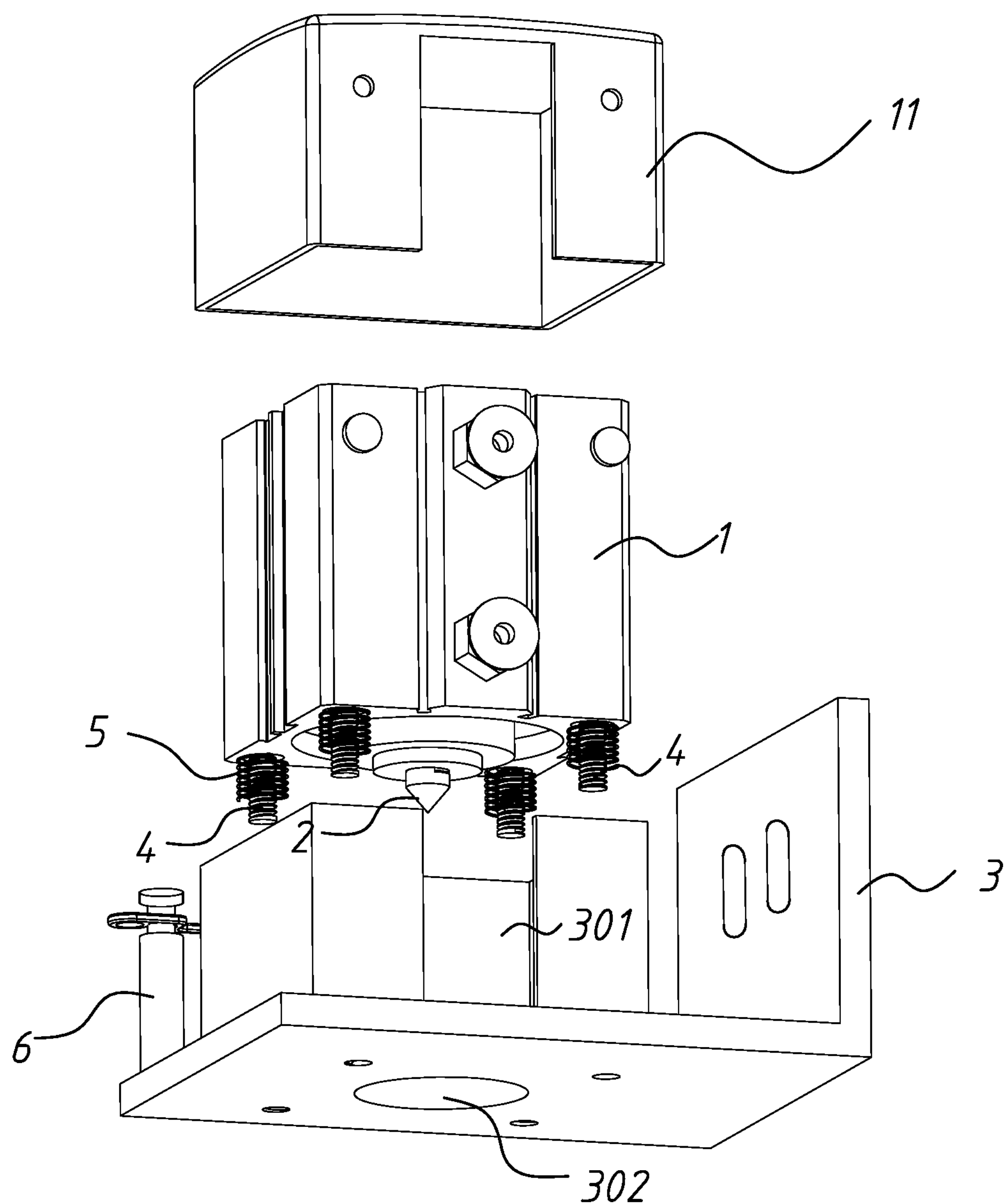
F I G. 4

PNEUMATIC MOTOR VEHICLE WINDOW BREAKING DEVICE

BACKGROUND OF THE INVENTION

Field of the Invention

The present invention relates to a window breaking device, and more particularly, to a pneumatic motor vehicle window breaking device applied to large-sized vehicles such as motor buses, trains, motor cars, and railways.

Description of the Prior Art

As motor cars become more and more popular, accidents also increase, which results in casualties. A considerable part of the accidents is caused by that the vehicle is on fire or that driver and/or passenger fall into the water along with the car. Due to water pressure or power failure, the car door cannot be opened. The window glass of the car is very strong, especially a window glass having a tinted window film. It is difficult to crush the window glass, leading to people drowned or burned. There are some motor vehicle window breaking devices on the market. However, the structure is more complex, and some of the window braking devices use a power source as its power. When water enters the vehicle, the window breaking device will not work normally. Accordingly, the present invention intends to provide a dual faucet structure for improving the shortcomings mentioned above.

SUMMARY OF THE INVENTION

The primary object of the present invention is to overcome the shortcomings of the prior art and to provide a pneumatic motor vehicle window breaking device which has a simple structure and is reliable.

In order to achieve the aforesaid object, the pneumatic motor vehicle window breaking device of the present invention comprises a cylinder and a spike. One end of the spike is fixedly connected to an end of a piston rod of the cylinder. Another end of the spike is tapered. The cylinder may be mounted on a retaining frame.

Compared with the prior art, since the pneumatic motor vehicle window breaking device of the present invention directly uses the cylinder and takes high-pressure air as power. Only the front end of the spike of the pneumatic motor vehicle window breaking device is required to be mounted at an appropriate position in alignment with a vehicle window before use. An air valve is used to control the high pressure air source to push the spike for breaking the window. The structure is greatly simplified. In addition, even if water enters the vehicle, the high-pressure air source of the vehicle can be used for the normal operation.

BRIEF DESCRIPTION OF THE DRAWINGS

FIG. 4 is another exploded view in accordance with the preferred embodiment of the present invention and the retaining frame;

DETAILED DESCRIPTION OF THE PREFERRED EMBODIMENTS

Embodiments of the present invention will now be described, by way of example only, with reference to the accompanying drawings.

Figure 1:
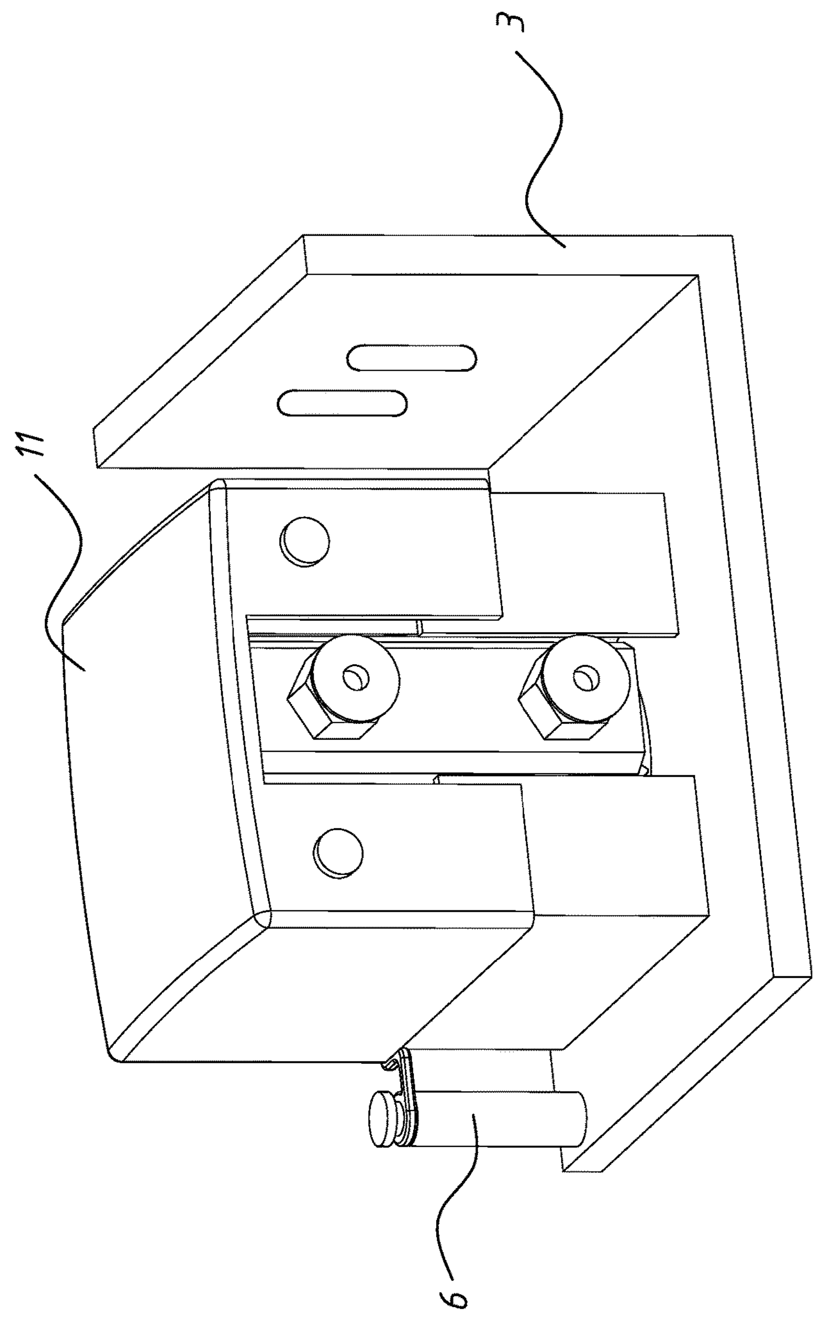
FIG. 1 is a perspective view in accordance with a preferred embodiment of the present invention and the retaining frame.
Figure 2:
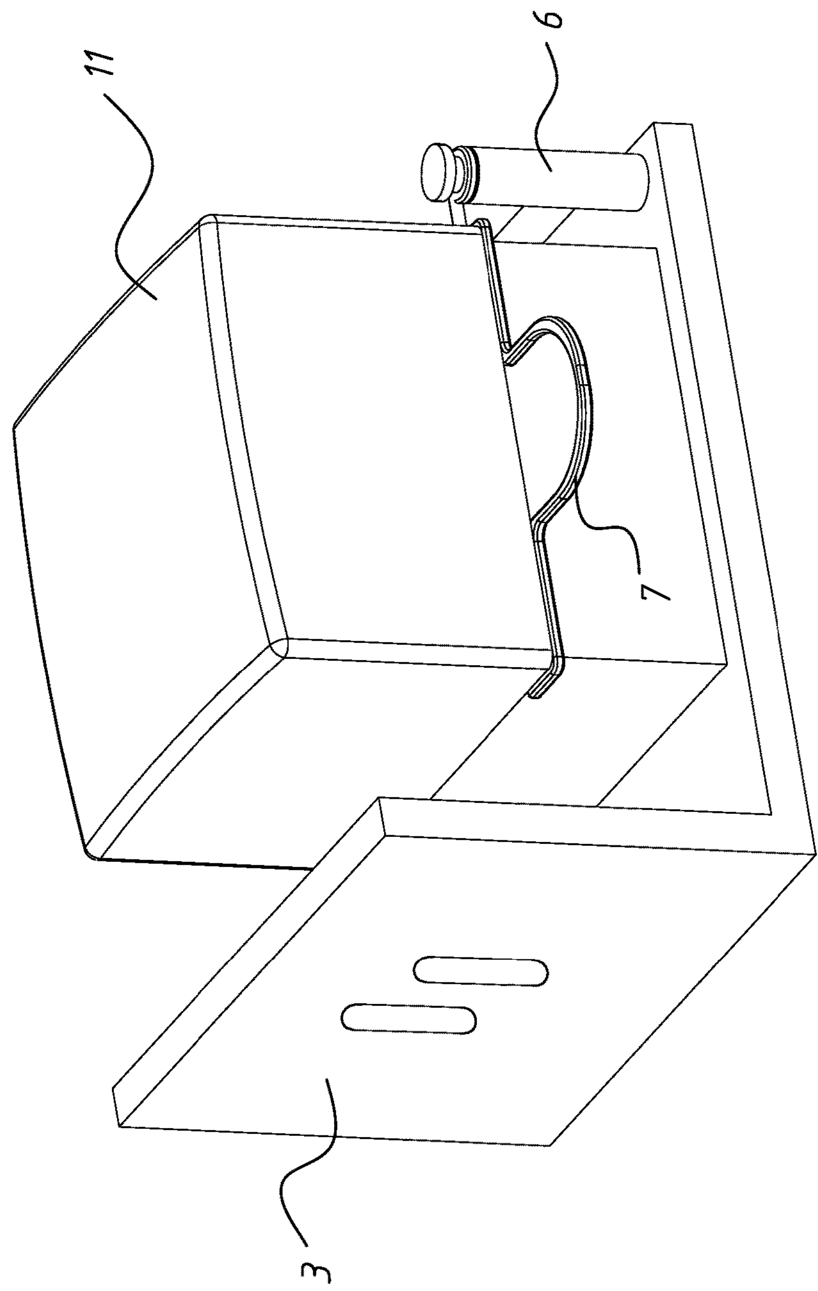
FIG. 2 is another perspective view in accordance with the preferred embodiment of the present invention and the retaining frame.
Figure 3:
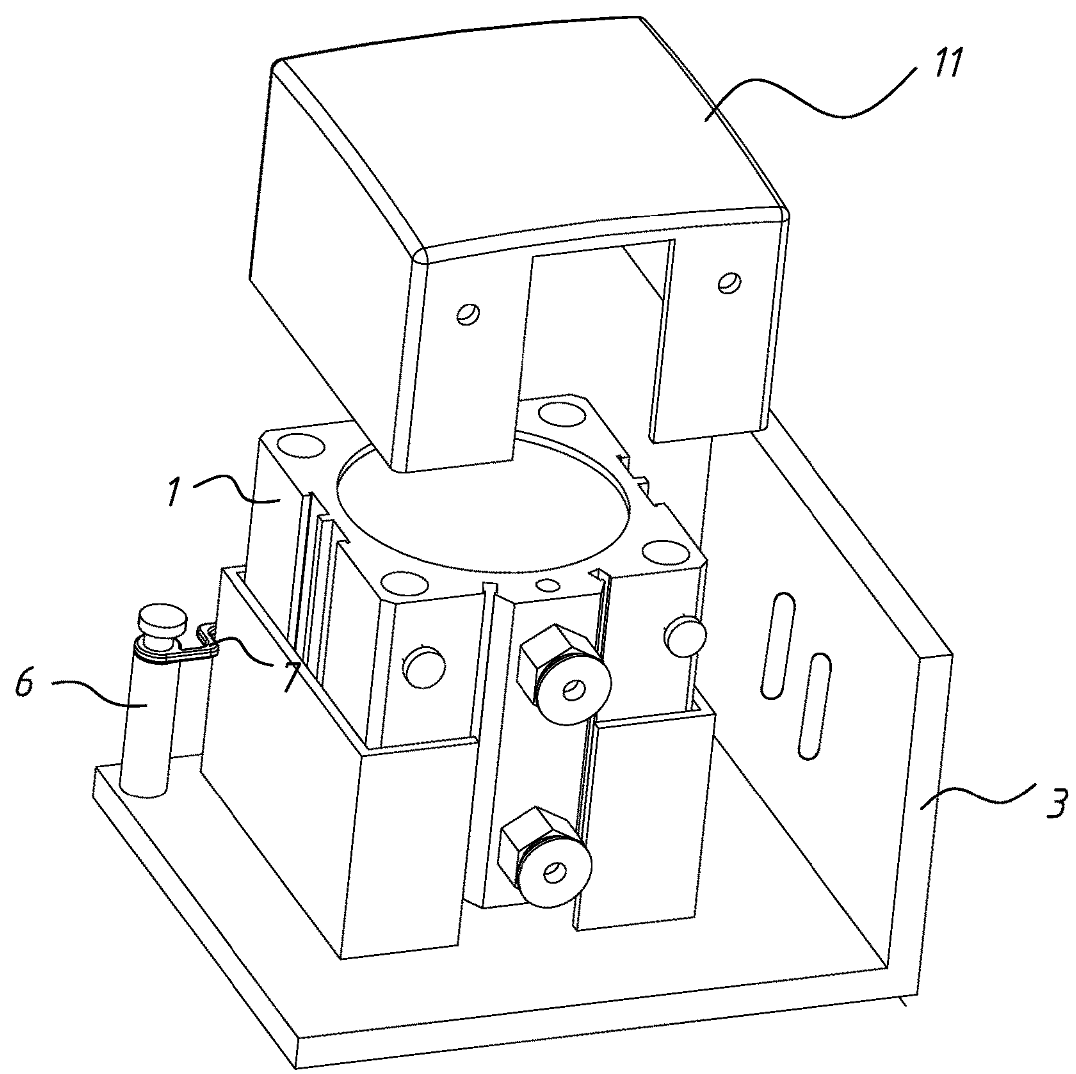
FIG. 3 is an exploded view in accordance with the preferred embodiment of the present invention and the retaining frame.
Figure 5:
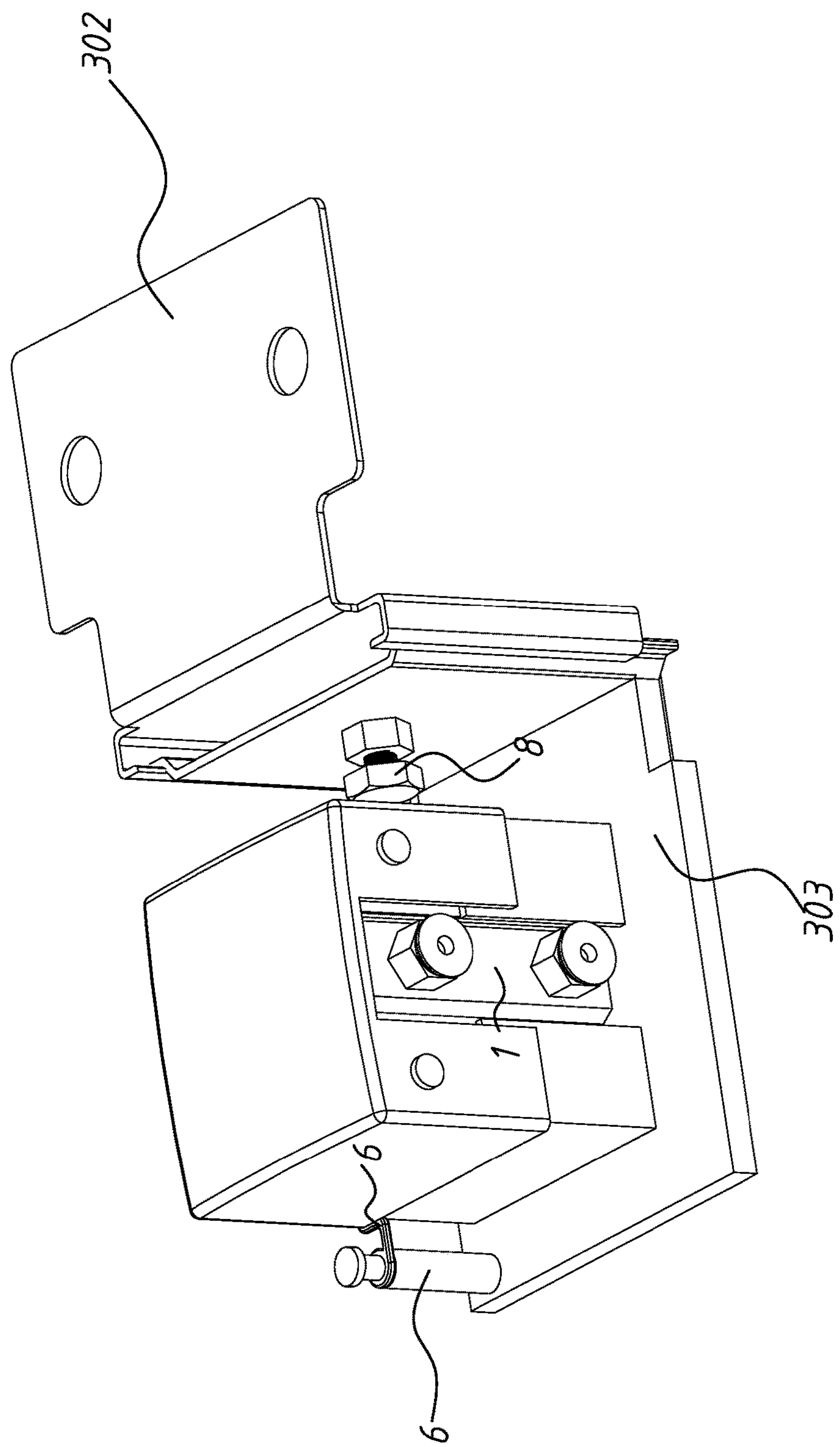
FIG. 5 is a perspective view in accordance with the preferred embodiment of the present invention and the adjustable retaining frame.
Figure 6:
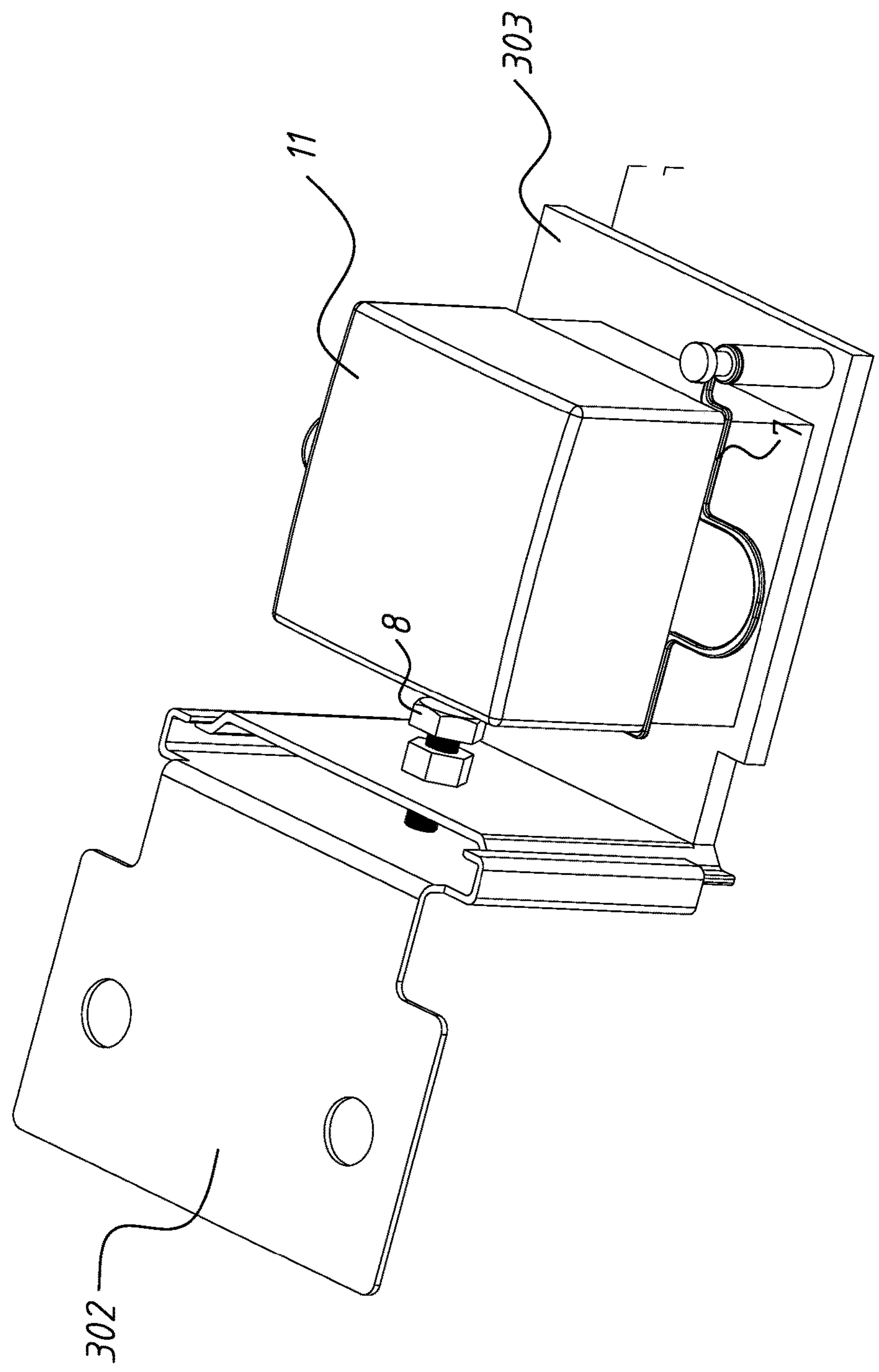
FIG. 6 is another perspective view in accordance with the preferred embodiment of the present invention and the adjustable retaining frame.
Figure 7:
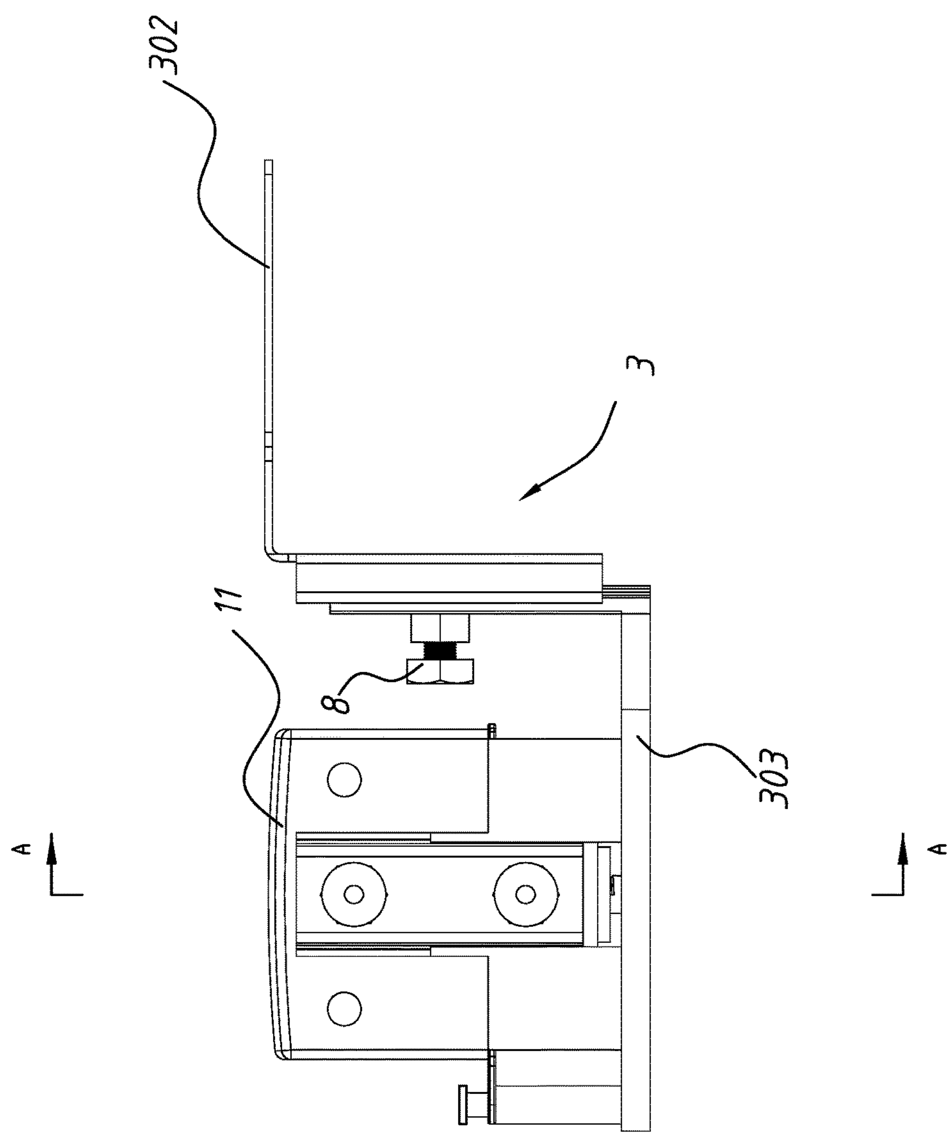
FIG. 7 is a front view in accordance with the preferred embodiment of the present invention and the adjustable retaining frame.
Figure 8:
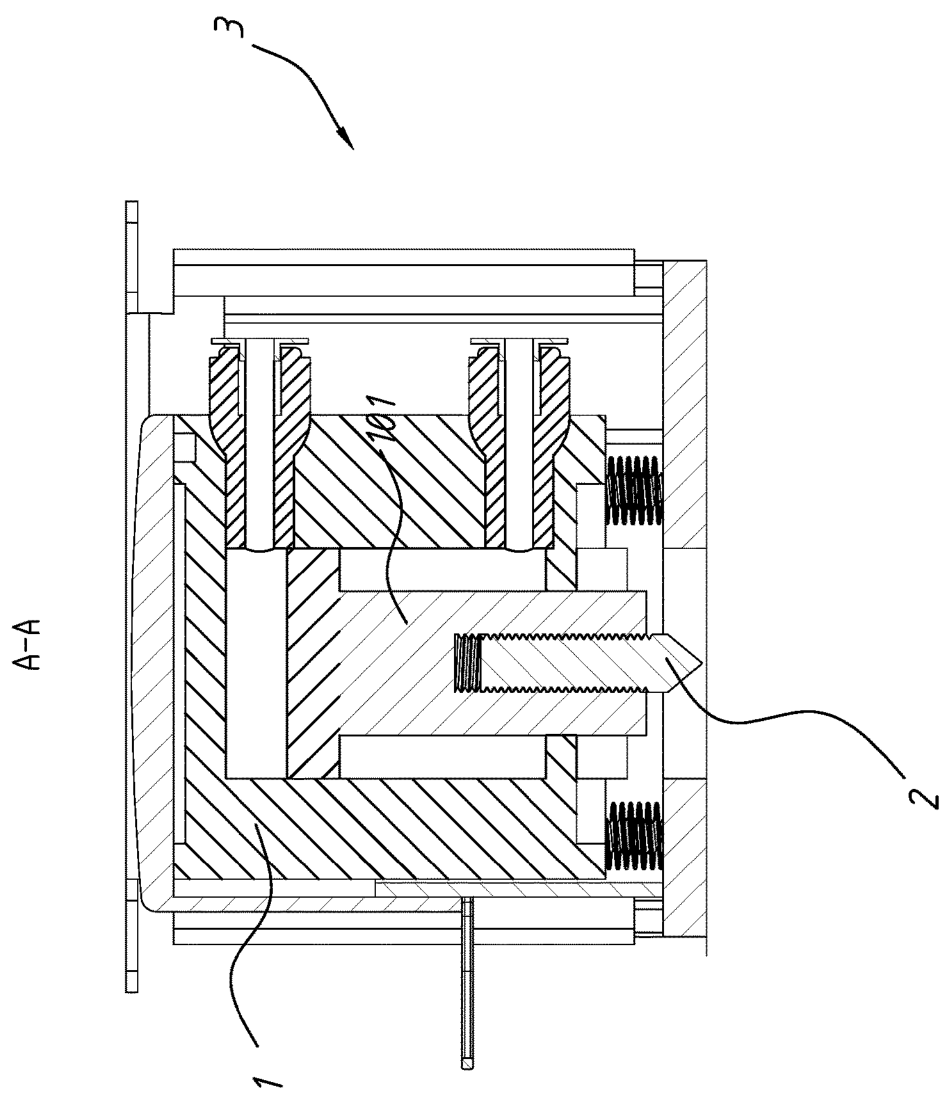
FIG. 8 is a sectional view taken along line A-A of FIG. 7.
Figure 9:
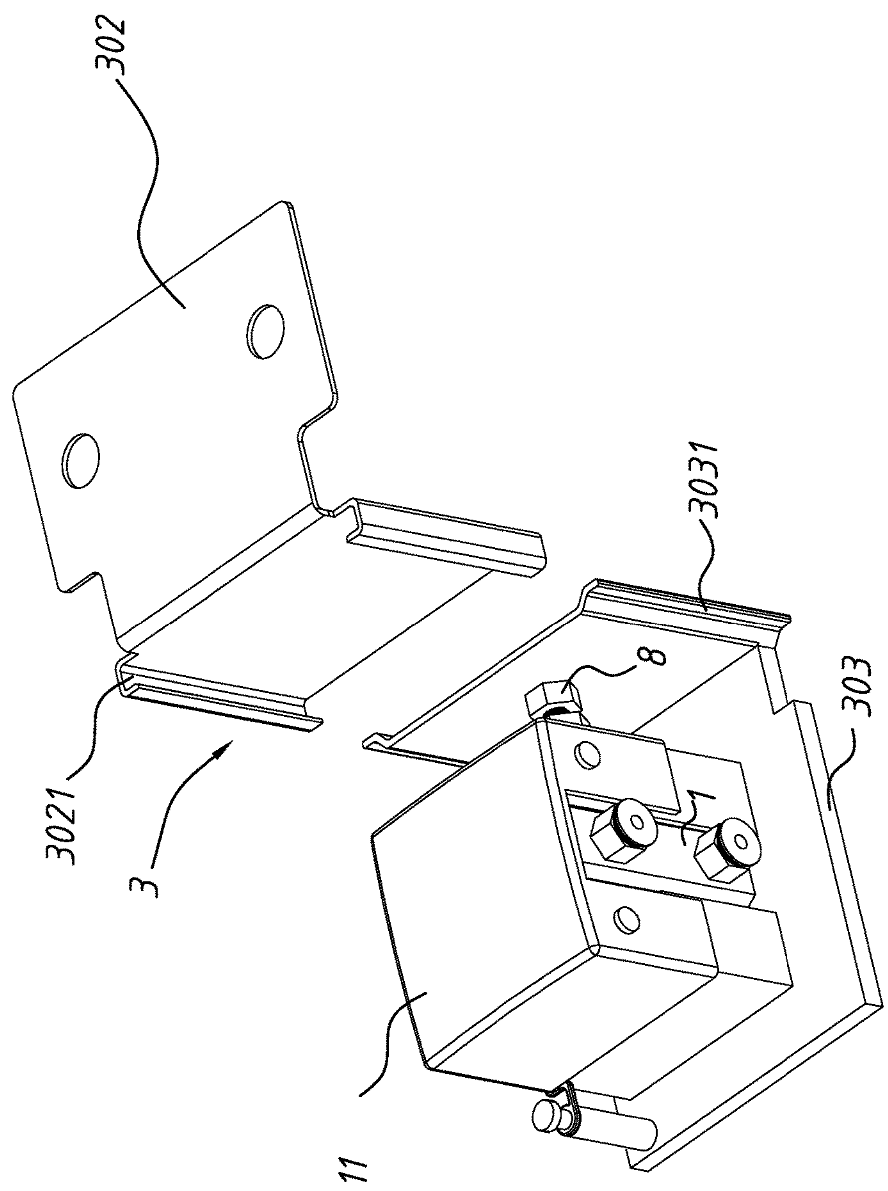
FIG. 9 is an exploded view in accordance with the preferred embodiment of the present invention and the adjustable retaining frame.

As shown in FIG. 1 to FIG. 3, a pneumatic motor vehicle window breaking device in accordance with a preferred embodiment of the present invention comprises a cylinder 1 and a spike 2. The cylinder 1 is preferably small in size. The spike 2 is preferably made of a hard alloy material. One end of the spike 2 is fixedly connected to an end of a piston rod 101 of the cylinder 1, and another end of the spike 2 is tapered. The spike 2 is integrally formed with the piston rod 101 if the cost is allowed. The cylinder 1 is mounted on a retaining frame 3. The cylinder 1 is mounted to a vehicle through the retaining frame 3. The specific shape of the retaining frame 3 may depend on the specific circumstances of the vehicle and the installation location.

The cylinder 1 can be fixedly mounted on the retaining frame 3. The cylinder 1 can be directly used with high-pressure air as a power for breaking a window. The existing vehicle has air pressure of 5 kg or more to be used normally.

The cylinder 1 of the pneumatic motor vehicle window breaking device may be slidably mounted on the retaining frame 3, such that the pneumatic motor vehicle window breaking device still can be used for breaking a window in the event that a high-pressure air source cannot be used. The sliding direction of the cylinder 1 coincides with the direction of movement of the piston rod 101 of the cylinder 1. The pneumatic motor vehicle window breaking device further comprises an elastic return structure. The elasticity of the elastic return structure enables the tapered end of the spike 2 of the pneumatic motor vehicle window breaking device when in a waiting state won't get into contact with the window to scratch the glass. When it is necessary to break the window, by pressing the cylinder 1 to overcome the elasticity of the elastic return structure, the spike 2 is driven to hit the window, thereby breaking the window.

There are various specific implementations for slide installation. In general, a guide structure is combined with the elastic return structure. In this specific embodiment, as shown in FIG. 4 to FIG. 9, the retaining frame 3 is a metal component having an L-shaped cross-section. One side of the retaining frame 3 is provided with a cylindrical cylinder accommodation chamber 301. The cylinder accommodation chamber 301 has an open upper end. The cross-section of the cylinder accommodation chamber 301 corresponds in shape to the cylinder 1. In this specific embodiment, the cylinder 1 has a rectangular shape. The bottom of the cylinder accommodation chamber 301 is formed with a central through hole 304 through which the spike 2 passes. The retaining frame 3 is provided with at least two guide posts 4 in a direction corresponding to the movement of the piston rod 101 of the cylinder 1. A coil spring 5 is fitted on each of the guide posts 4. The cylinder 1 is formed with guide holes corresponding to the guide posts 4. The cylinder 1 is slidably mounted on the retaining frame 3 by clearance fit through the guide holes and the guide posts 4 to constitute the guide structure. The coil spring 5 constitutes the elastic return structure. This specific embodiment is provided with four guide posts 4. The guide posts 4 disposed in the vicinity of the through hole 304 at the bottom of the cylinder accommodation chamber 301. Each of the guide posts 4 is fitted with the coil spring 5. The cylinder 1 is slidably mounted in the cylinder accommodation chamber 301 by clearance fit through the guide holes 102 and the guide posts 4. Two ends of the coil spring 5 lean against the end face of the cylinder 1 and the bottom of the cylinder accommodation chamber 301, respectively. A portion of the upper end of the cylinder 1 is exposed, and the upper end of the cylinder 1 is provided with an upper cover 11 to cover the upper end of the cylinder 1. The upper cover 11 is in clearance fit with the cylindrical cylinder accommodation chamber 301. The upper cover 11 is slidably disposed in a direction corresponding to the movement of the piston rod 101 of the cylinder 1. In this way, the cylinder 1 can be driven down by hitting the upper cover 11, thereby breaking the window. Preferably, the pneumatic motor vehicle window breaking device further comprises a locking structure for restricting the sliding of the upper cover 11 in order to prevent the upper cover 11 being hit by accident to break the window. The locking structure may consist of pins and a pair of pin holes. The pin holes are disposed on opposing side walls of the cylindrical cylinder accommodation chamber 301. The pin holes are located on an outer wall of the cylinder accommodation chamber 301 corresponding in position to a lower edge of a side wall of the upper cover 11. The pins are in clearance fit with the pin holes. Inserting the pins in the pair of pin holes can prevent the upper cover 11 from being pressed down. If it is necessary to break the window, the pins can be pulled out for the operation of breaking the window. In the specific embodiment, the locking structure is in the form of a snap ring. In particular, one side of the cylinder accommodation chamber 301 is provided with an upright shaft 6 and a snap ring 7. The snap ring 7 has a shape matching the outer contour of the cylinder accommodation chamber 301. One end of the snap ring 7 is provided with a ring which is in clearance fit with the upright shaft 6. The snap ring 7 is disposed at the lower edge of the side wall of the upper cover 11, so that the snap ring 7 can be rotated about the upright shaft 6. The snap ring 7 is rotated about the upright shaft 6 in two states. One is a locking state, that is, the snap ring 7 is engaged with the outer wall of the cylinder accommodation chamber 301. The other is an unlocking state, that is, the sap ring 7 is disengaged from the outer wall of the cylinder accommodation chamber 301.

The locking structure may be in the form of another snap ring 7, that is, the locking structure includes a snap ring 7. The outer wall of the cylinder accommodation chamber 301 and the lower edge of the side wall of the upper cover 11 are formed with corresponding engaging grooves. The snap ring 7 corresponds to the engaging grooves and the outer contour of the cylinder accommodation chamber 301. When the snap ring 7 is engaged in the engaging grooves, it is in a locking state. When the snap ring 7 is disengaged from the engaging grooves, it is in an unlocking state.

In order to be used at different positions, the retaining frame 3 includes a cylinder mounting plate 302 and a retaining plate 303. The cylinder 1 is mounted on the cylinder mounting plate 302. The cylinder mounting plate 302 and the retaining plate 303 are provided with slide grooves 3021 and matching slide ribs 3031, respectively. In the specific embodiment, the cylinder mounting plate 302 is a rectangular metal plate which is folded into an L-shaped cross section. The cylinder 1 is mounted to one side of the L-shaped cylinder mounting plate 302. Two ends of the other side of the L-shaped cylinder mounting plate 302 is formed with the slide ribs 3031. The cylinder mounting plate 302 and the retaining plate 303 have the slide grooves 3021 and the slide ribs 3031 to mate with each other so that the cylinder 1 is slidably mounted on the retaining frame 3. The corresponding sides of the cylinder mounting plate 302 and the retaining plate 303 are formed with screw holes, and the screw holes are provided with fastening screws 8 to constitute a fastening mechanism. When the fastening screw 8 is tightened, the end of the fastening screw 8 is pressed against the retaining plate 303. When the fastening screw 8 is loosened, the cylinder mounting plate 302 can be pulled for a position adjustment.

For a multi-layer window structure, the pneumatic motor vehicle window breaking device of the present invention can be repeatedly hit manually or controls the air valve to connect with a high-pressure air source for consecutively breaking the window several times.

Figure 10:
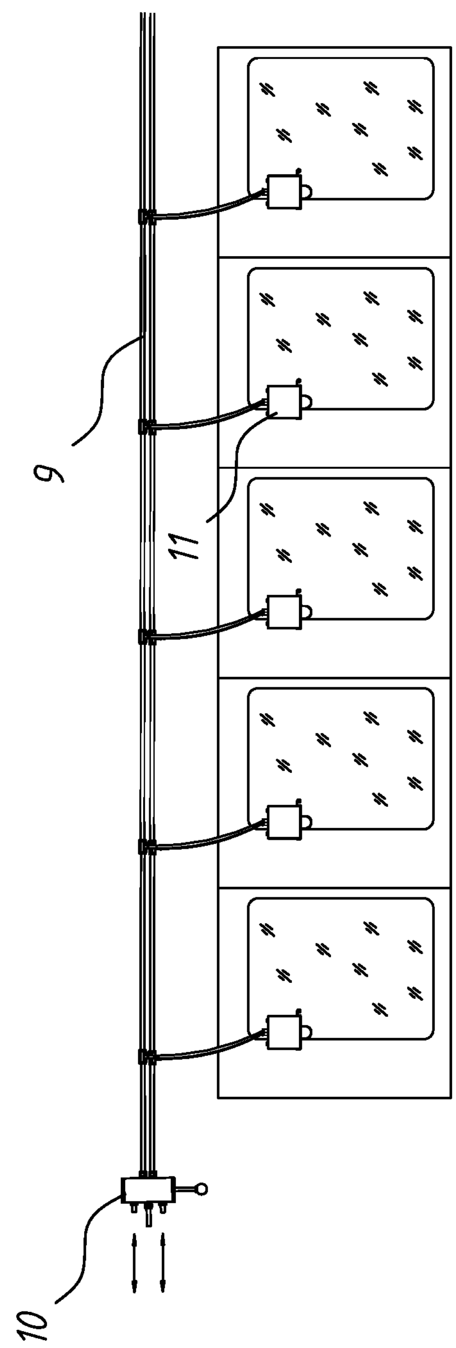
FIG. 10 is a schematic view of the interlinked pneumatic motor vehicle window breaking device of the present invention when in use.

In order to allow the pneumatic motor vehicle window breaking device to be suitable for large-sized vehicles with multiple windows, such as large-sized passenger cars, a plurality of pneumatic motor vehicle window breaking devices can be assembled to form an interlinked pneumatic motor vehicle window breaking device. As shown in FIG. 10, the interlinked pneumatic motor vehicle window breaking device comprises a plurality of pneumatic motor vehicle window breaking devices each composed of a cylinder 1 and a spike 2, which can be any one of the aforesaid pneumatic motor vehicle window breaking devices. One end of the spike 2 of each pneumatic motor vehicle window breaking device is fixedly connected to an end of the piston rod 101 of the cylinder 1, and the other end of the spike 2 is tapered. The cylinder 1 is mounted on a retaining frame 3. The cylinder 1 of each pneumatic motor vehicle window breaking device is connected with a high-pressure air source through an air tube 9 and an air valve 10. The air valve 10 controls the connection and disconnection of the high-pressure air source and the cylinder 1 and the direction and the air.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A pneumatic motor vehicle window breaking device, comprising a cylinder and a spike, one end of the spike being fixedly connected to an end of a piston rod of the cylinder, another end of the spike being tapered; wherein the cylinder is slidably mounted on a retaining frame in a direction corresponding to movement of the piston rod of the cylinder; the pneumatic motor vehicle window breaking device further comprises an elastic return structure, and the elastic return structure enables the tapered end of the spike of the pneumatic motor vehicle window breaking device when in a waiting state won't get into contact with a window; the retaining frame is provided with at least two guide posts in a direction corresponding to movement of the piston rod of the cylinder, a coil spring is fitted on each of the guide posts, the cylinder is formed with guide holes corresponding to the guide posts, the cylinder is slidably mounted on the retaining frame by clearance fit through the guide holes and the guide posts, and the coil spring constitutes the elastic return structure.

2. The pneumatic motor vehicle window breaking device as claimed in claim 1, wherein the retaining frame is provided with a cylindrical cylinder accommodation chamber, the cylinder accommodation chamber has an open upper end, a bottom of the cylinder accommodation chamber is formed with a central through hole through which the spike passes, the guide posts are disposed in the vicinity of the through hole at the bottom of the cylinder accommodation chamber, each of the guide posts is fitted with a coil spring, the cylinder is slidably mounted in the cylinder accommodation chamber by clearance fit through guide holes and the guide posts, two ends of the coil spring lean against an end face of the cylinder and the bottom of the cylinder accommodation chamber respectively, the coil spring constitutes the elastic return structure, a portion of an upper end of the cylinder is exposed, the upper end of the cylinder is covered with an upper cover, the upper cover is in clearance fit with the cylindrical cylinder accommodation chamber, and the upper cover is slidably disposed in a direction corresponding to movement of the piston rod of the cylinder.

3. The pneumatic motor vehicle window breaking device as claimed in claim 2, further comprising a locking structure for restricting sliding of the upper cover.

4. The pneumatic motor vehicle window breaking device as claimed in claim 1, wherein the retaining frame includes a cylinder mounting plate and a retaining plate, the cylinder is mounted on the cylinder mounting plate, the cylinder mounting plate and the retaining plate are provided with slide grooves and matching slide ribs respectively, the cylinder mounting plate and the retaining plate have the slide grooves and the slide ribs to constitute an adjustment mechanism so that the cylinder is slidably mounted on the retaining frame.

5. The pneumatic motor vehicle window breaking device as claimed in claim 1, wherein the cylinder is mounted on a retaining frame.

* * * * *